(12) United States Patent
Yamamoto et al.

(10) Patent No.: US 9,705,343 B2
(45) Date of Patent: Jul. 11, 2017

(54) VOLTAGE EQUALIZER

(71) Applicant: KABUSHIKI KAISHA TOYOTA JIDOSHOKKI, Aichi (JP)

(72) Inventors: Satoshi Yamamoto, Kariya (JP); Shinji Hirose, Kariya (JP); Wataru Makishi, Kariya (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 209 days.

(21) Appl. No.: 14/436,311

(22) PCT Filed: Sep. 26, 2013

(86) PCT No.: PCT/JP2013/076074
§ 371 (c)(1),
(2) Date: Apr. 16, 2015

(87) PCT Pub. No.: WO2014/073280
PCT Pub. Date: May 15, 2014

(65) Prior Publication Data
US 2015/0244190 A1    Aug. 27, 2015

(30) Foreign Application Priority Data

Nov. 7, 2012 (JP) .................. 2012-244980

(51) Int. Cl.
*H02J 7/00* (2006.01)
*H01M 10/44* (2006.01)
(Continued)

(52) U.S. Cl.
CPC ......... *H02J 7/0014* (2013.01); *H01M 10/441* (2013.01); *H01M 10/482* (2013.01);
(Continued)

(58) Field of Classification Search
USPC ......................................... 320/118
See application file for complete search history.

(56) References Cited

U.S. PATENT DOCUMENTS

| | | | |
|---|---|---|---|
| 2008/0036424 A1 | 2/2008 | Saigo | |
| 2012/0056594 A1* | 3/2012 | Yanagihara | H02J 7/0014 320/134 |
| 2012/0161707 A1* | 6/2012 | Kim | H02J 7/0016 320/118 |

FOREIGN PATENT DOCUMENTS

| | | |
|---|---|---|
| JP | 2008-48496 | 2/2008 |
| JP | 2009-11022 | 1/2009 |
| JP | 2012-60691 | 3/2012 |

OTHER PUBLICATIONS

Extended European Search Report for EP Application No. 13853326.0 dated May 20, 2016.
(Continued)

*Primary Examiner* — Robert Grant
(74) *Attorney, Agent, or Firm* — Greenblum & Bernstein, P.L.C.

(57) ABSTRACT

A voltage equalizer includes voltage detectors that detect voltages of respective cells, switches, and a controller that repeatedly sets a lowest voltage among voltages detected by one of the voltage detectors to be a target voltage Vt1 or Vt2 in each of the battery packs, and that repeatedly turns on/off each of the switches such that the voltages of the cells other than the cell having the lowest voltage become the target voltage Vt1 or Vt2 in each of the battery packs, until the controller determines on the basis of the respective voltages detected by the voltage detectors that a cell balance control operation does not need to be performed.

4 Claims, 3 Drawing Sheets

(51) Int. Cl.
*H01M 10/48* (2006.01)
*H01M 10/42* (2006.01)

(52) U.S. Cl.
CPC ... *H02J 7/0016* (2013.01); *H01M 2010/4271* (2013.01); *Y02T 10/7055* (2013.01)

(56) References Cited

OTHER PUBLICATIONS

Search report from PCT/JP2013/076074, mail date is Nov. 5, 2013.
Japanese Office Action, dated Oct. 29, 2013, along with an english translation thereof.

* cited by examiner

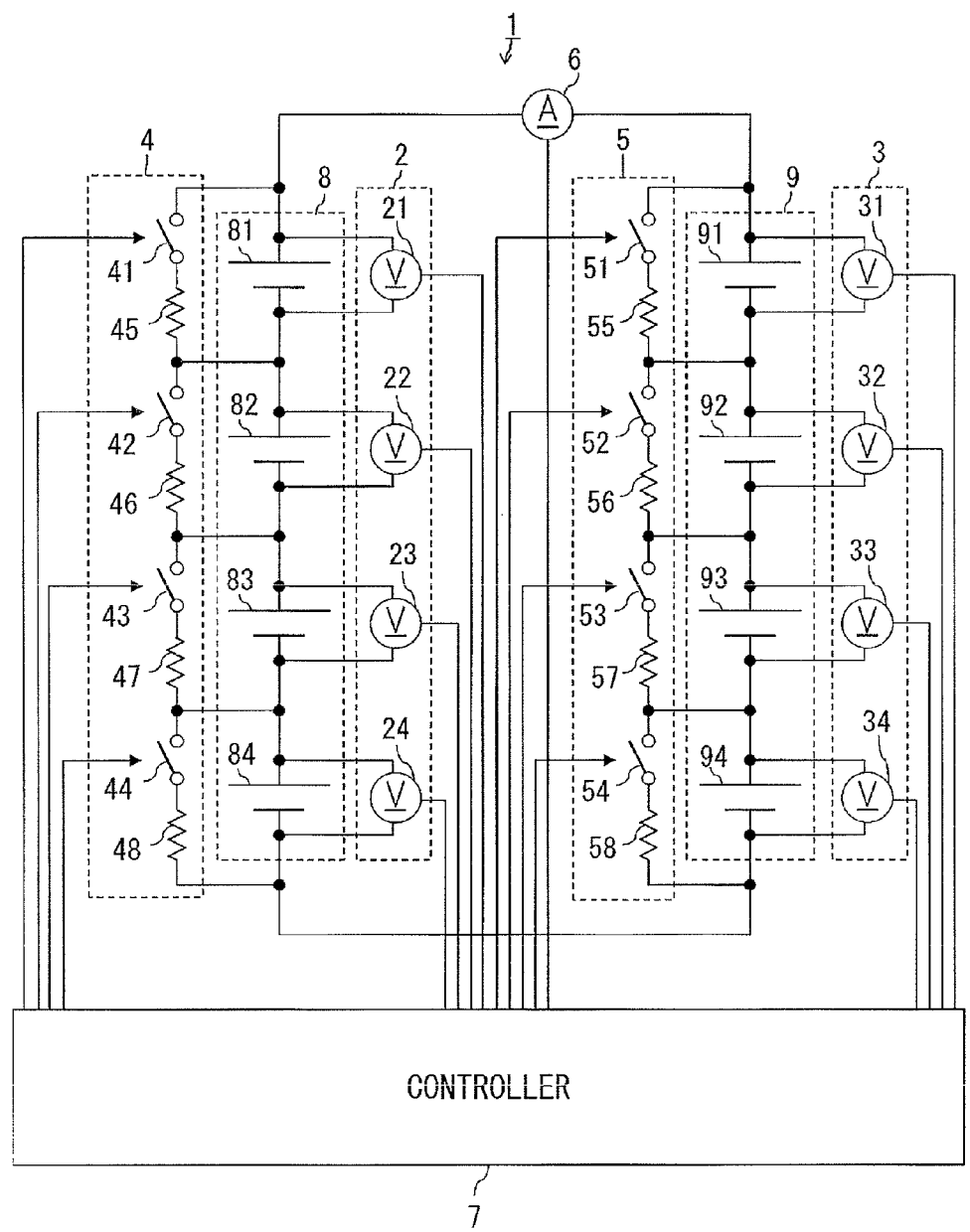
F I G. 1

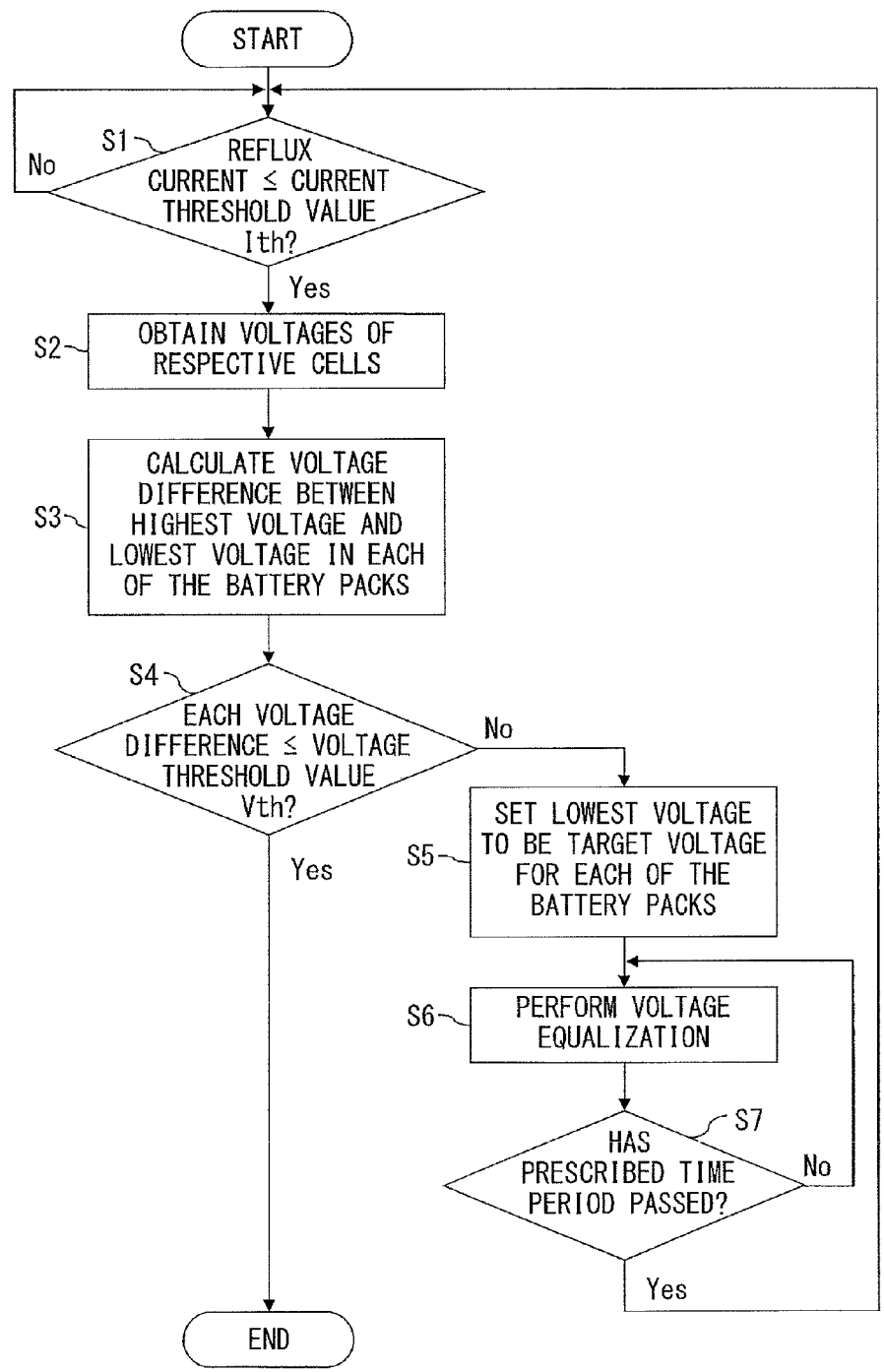
F I G. 2

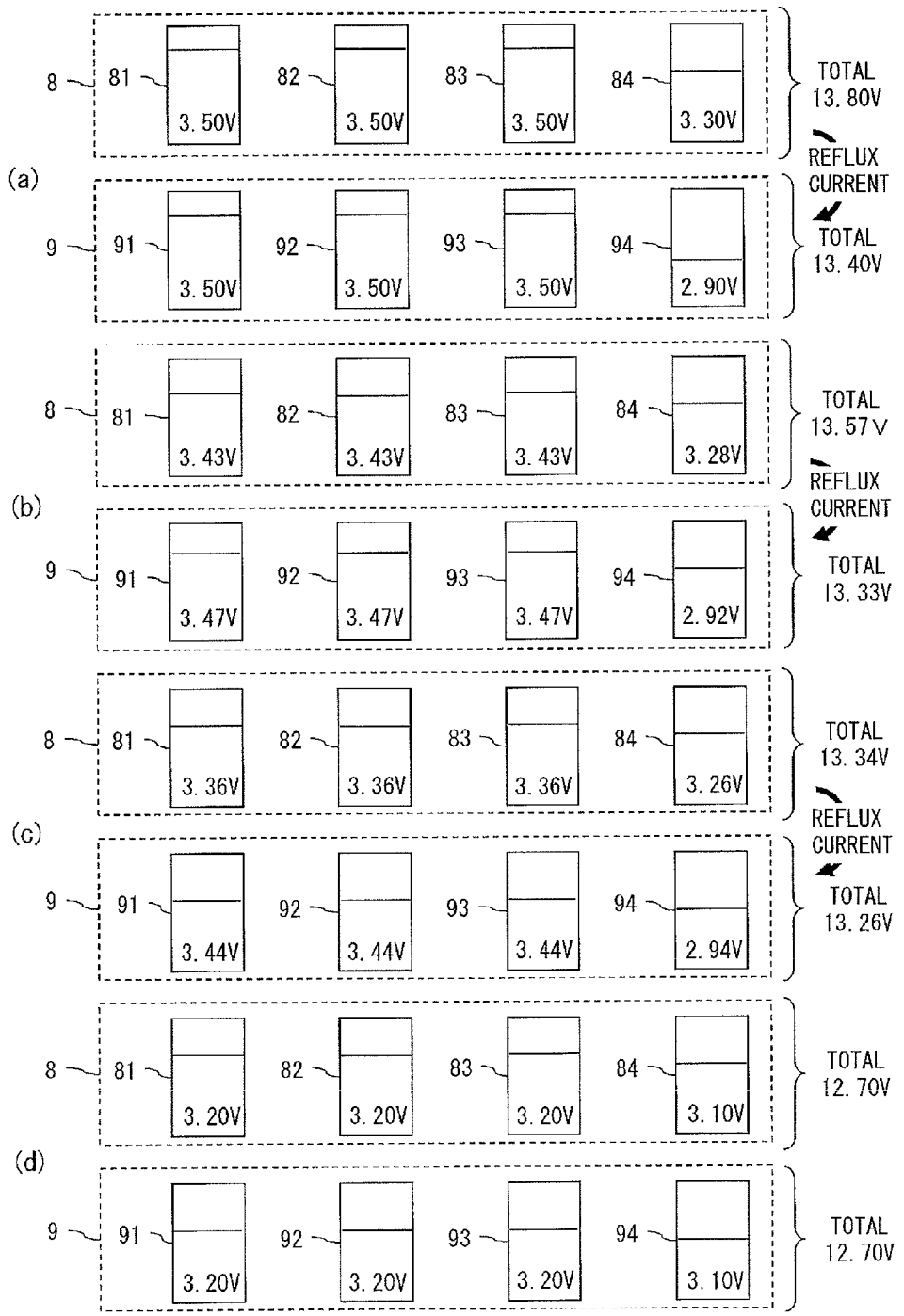
F I G. 3

VOLTAGE EQUALIZER

TECHNICAL FIELD

The present invention relates to a voltage equalizer that equalizes voltages of a plurality of cells that constitute each of a plurality of battery packs connected in parallel to each other.

BACKGROUND ART

A technology for configuring a battery pack by connecting a plurality of rechargeable cells in series so as to realize a high-voltage battery has been put to practical use. In recent years, batteries of this type have been attracting attention in mounting on vehicles such as electric forklift trucks, hybrid vehicles, or electric vehicles. Some of the batteries of this type are configured so as to connect a plurality of battery packs in parallel to each other in order to stably supply large electric power to a load.

When a plurality of cells are charged in a state in which the plurality of cells are connected in series, voltages of the respective cells (or charging capacities of the respective cells) sometimes become non-uniform. When the battery above is mounted on a vehicle, discharging of the battery when a motor for traveling is driven and charging of the battery when the motor for traveling generates power are repeated, and the repetition of charging and discharging also sometimes causes the voltages of the respective cells to be non-uniform. The non-uniformity of the voltages of the respective cells may cause the deterioration of some of the cells to be promoted, and may cause efficiency of the entirety of the battery to be reduced. The non-uniformity of the voltages of the respective cells can be caused due to manufacturing variations or deterioration over time of the respective cells. In view of the foregoing, a voltage equalizer has been proposed for example that equalizes voltages of a plurality of cells by discharging cells having voltages higher than a target voltage from among the plurality of cells by using resistors (see, for example, Patent Document 1).

PRIOR ART DOCUMENTS

Patent Document

Patent Document 1: Japanese Laid-Open Patent Publication No. 2012-60691

SUMMARY OF THE INVENTION

Problems to be Solved by the Invention

However, in a case in which respective battery packs are connected in parallel to each other, when voltages of respective cells in the respective battery packs are equalized but when total voltages of the respective battery packs are non-uniform, a reflux current flows between the respective battery packs such that one of the respective battery packs is discharged and another battery pack is charged, and therefore the voltages of the respective cells in the respective battery packs may become non-uniform.

An object of the present invention is to provide a voltage equalizer that can equalize voltages of a plurality of cells that constitute each of a plurality of battery packs connected in parallel to each other.

Means for Solving the Problems

A voltage equalizer according to the present invention includes voltage detectors that detect voltages of a plurality of cells that constitute each of a plurality of battery packs connected in parallel to each other, a plurality of resistors that are respectively connected in parallel to the plurality of cells, a plurality of switches that are respectively provided between the plurality of cells and the plurality of resistors, and a controller that repeatedly sets the lowest voltage among the voltages detected by the voltage detector to be a target voltage in each of the plurality of battery packs, and that repeatedly turns on/off each of the plurality of switches such that the voltages of the cells other than the cell having the lowest voltage become the target voltage in each of the plurality of battery packs, until the controller determines on the basis of the voltages detected by the voltage detector that the voltages of the plurality of cells do not need to be equalized.

This allows voltage equalization to be repeatedly performed with a high accuracy in each of the battery packs until the respective battery packs have a total voltage similar to each other and fluctuation in cell voltages due to the influence of a reflux current or energy consumption of the resistors becomes small. Namely, this allows respective voltages of the plurality of cells that constitute each of the battery packs connected in parallel to each other to be equalized.

The controller may be configured so as to determine that the voltages of the plurality of cells do not need to be equalized when a voltage difference between the highest voltage and the lowest voltage among the voltages detected by the voltage detector becomes less than or equal to a voltage threshold value in each of the plurality of battery packs.

The voltage equalizer according to the present invention further includes a current detector that detects a current that flows between the respective battery packs, and the controller may be configured so as to commence determining whether the voltages of the plurality of cells need to be equalized, when the current detected by the current detector has a value less than or equal to a current threshold value.

Effect of the Invention

According to the present invention, voltages of a plurality of cells that constitute each of a plurality of battery packs connected in parallel to each other can be equalized.

BRIEF DESCRIPTION OF THE DRAWINGS

FIG. 1 illustrates a voltage equalizer according to an embodiment of the present invention.

FIG. 2 is a flowchart illustrating a cell balance control operation of a controller.

FIG. 3 illustrates an example of increase or decrease in voltages of respective cells during the cell balance control operation.

DESCRIPTION OF EMBODIMENTS

FIG. 1 illustrates a voltage equalizer according to an embodiment of the present invention.

A voltage equalizer 1 illustrated in FIG. 1 equalizes voltages of respective cells in a battery mounted on a vehicle such as an electric forklift truck, a hybrid vehicle, or an electric vehicle, and includes voltage detectors 2 and 3, cell balance units 4 and 5, a current detector 6, and a controller 7. The battery is constituted of two battery packs 8 and 9 connected in parallel to each other. The battery pack 8 is constituted of four cells 81-84 connected in series with each other, and the battery pack 9 is constituted of four cells 91-94 connected in series with each other. As an example, each of the cells 81-84 and the cells 91-94 is configured by using a lithium-ion secondary battery or the like. The battery is assumed to supply power to a motor for traveling via an inverter circuit, or to supply power to electric equipment such as lighting, a heater, or a car navigation device. The number of battery packs that are connected in parallel to each other in order to configure the battery is not limited to two. The number of cells that constitutes each of the battery packs is not limited to four.

The voltage detector 2 includes voltage sensors 21-24, the voltage sensor 21 detects a voltage V81 of the cell 81, the voltage sensor 22 detects a voltage V82 of the cell 82, the voltage sensor 23 detects a voltage V83 of the cell 83, and the voltage sensor 24 detects a voltage V84 of the cell 84.

The voltage detector 3 includes voltage sensors 31-34, the voltage sensor 31 detects a voltage V91 of the cell 91, the voltage sensor 32 detects a voltage V92 of the cell 92, the voltage sensor 33 detects a voltage V93 of the cell 93, and the voltage sensor 34 detects a voltage V94 of the cell 94.

The cell balance unit 4 includes switches 41-44 and resistors 45-48. The switch 41 and the resistor 45 that are connected in series with each other are connected in parallel to the cell 81, the switch 42 and the resistor 46 that are connected in series with each other are connected in parallel to the cell 82, the switch 43 and the resistor 47 that are connected in series with each other are connected in parallel to the cell 83, and the switch 44 and the resistor 48 that are connected in series with each other are connected in parallel to the cell 84. The switches 41-44 are configured by using, for example, a MOSFET, an electromagnetic relay, or the like. When the switch 41 is turned on and the cell 81 and the resistor 45 are electrically connected to each other, the cell 81 is discharged by the resistor 45, and the voltage of the cell 81 decreases. When the switch 42 is turned on and the cell 82 and the resistor 46 are electrically connected to each other, the cell 82 is discharged by the resistor 46, and the voltage of the cell 82 decreases. When the switch 43 is turned on and the cell 83 and the resistor 47 are electrically connected to each other, the cell 83 is discharged by the resistor 47, and the voltage of the cell 83 decreases. When the switch 44 is turned on and the cell 84 and the resistor 48 are electrically connected to each other, the cell 84 is discharged by the resistor 48, and the voltage of the cell 84 decreases.

The cell balance unit 5 includes switches 51-54 and resistors 55-58. The switch 51 and the resistor 55 that are connected in series with each other are connected in parallel to the cell 91, the switch 52 and the resistor 56 that are connected in series with each other are connected in parallel to the cell 92, the switch 53 and the resistor 57 that are connected in series with each other are connected in parallel to the cell 93, and the switch 54 and the resistor 58 that are connected in series with each other are connected in parallel to the cell 94. The switches 51-54 are configured by using, for example, a MOSFET, an electromagnetic relay, or the like. When the switch 51 is turned on and the cell 91 and the resistor 55 are electrically connected to each other, the cell 91 is discharged by the resistor 55, and the voltage of the cell 91 decreases. When the switch 52 is turned on and the cell 92 and the resistor 56 are electrically connected to each other, the cell 92 is discharged by the resistor 56, and the voltage of the cell 92 decreases. When the switch 53 is turned on and the cell 93 and the resistor 57 are electrically connected to each other, the cell 93 is discharged by the resistor 57, and the voltage of the cell 93 decreases. When the switch 54 is turned on and the cell 94 and the resistor 58 are electrically connected to each other, the cell 94 is discharged by the resistor 58, and the voltage of the cell 94 decreases.

The current detector 6 is provided in a path connecting the battery packs 8 and 9 in parallel to each other, detects a current (ref lux current) that flows from the battery pack 8 to the battery pack 9 or a current (reflux current) from the battery pack 9 to the battery pack 8, and sends the detected current to the controller 7.

The controller 7 is configured by, for example, a CPU (Central Processing Unit), a programmable device (FPGA (Field Programmable Gate Array) or PLD (Programmable Logic Device)), or the like, and the CPU or the programmable device reads and executes a program stored in a storage unit (not illustrated) in the controller 7 such that a cell balance control operation is performed on the basis of voltages detected by the voltage detectors 2 and 3 or a current detected by the current detector 6. The storage unit may be provided outside the controller 7.

FIG. 2 is a flowchart illustrating the cell balance control operation of the controller 7.

When a current detected by the current detector 6 has a value less than or equal to a current threshold value Ith ("Yes" in S1), the controller 7 first obtains the voltages V81-V84 from the voltage detector 2, and obtains the voltages V91-V94 from the voltage detector 3 (S2).

The controller 7 then calculates a voltage difference Vd1 between the highest voltage and the lowest voltage among the voltages V81-V84, and calculates a voltage difference Vd2 between the highest voltage and the lowest voltage among the voltages V91-V94 (S3).

When the controller 7 determines that neither the voltage difference Vd1 nor the voltage difference Vd2 is less than or equal to a voltage threshold value Vth, that is, when the controller 7 determines on the basis of the voltages V81-V84 and the voltages V91-V94 detected by the voltage detectors 2 and 3 that the respective voltages of the cells 81-84 and the cells 91-94 need to be equalized ("No" in S4), the controller 7 sets the lowest voltage among the voltages V81-V84 to be a target voltage Vt1, and sets the lowest voltage among the voltages V91-94 to be a target voltage Vt2 (S5). When the controller 7 determines that both of the voltage differences Vd1 and Vd2 are less than or equal to the voltage threshold value Vth, that is, when the controller 7 determines on the basis of the voltages V81-V84 and the voltages V91-V94 detected by the voltage detectors 2 and 3 that the respective voltages of the cells 81-84 and the cells 91-94 do not need to be equalized ("Yes" in S4), the controller 7 finishes the cell balance control operation.

The controller 7 then controls ON/OFF of the switches 41-44 in the cell balance unit 4 such that voltages of cells other than a cell having the lowest voltage among the cells 81-84 in the battery pack 8 become the target voltage Vt1, and controls ON/OFF of the switches 51-54 in the cell balance unit 5 such that voltages of cells other than a cell having the lowest voltage among the cells 91-94 in the battery pack 9 become the target voltage Vt2 until a prescribed time period has passed (S6 and S7), and the process returns to S1. The prescribed time period is assumed to be, for example, a time period (e.g., 24 [ms]) that is shorter than a time period after the target voltage Vt1 is set and before the voltages other than the lowest voltage among the voltages V81-V84 reach the target voltage Vt1, or a time period after the target voltage Vt2 is set and before the voltages other than the lowest voltage among the voltages V91-V94 reach the target voltage Vt2. The prescribed time period is also assumed to be, for example, a time period needed for the lowest voltage among the voltages V81-V84 and the lowest voltage among the voltages V91-V94 to fluctuate by a prescribed voltage (e.g., ±0.02 [V]) due to a reflux current that flows from the battery pack 8 to the battery pack 9 or a reflux current that flows from the battery pack 9 to the battery pack 8.

As an example, the cell balance control operation of the controller 7 is described in a case in which, during a vehicle stop, when a current detected by the current detector 6 has a value less than or equal to the current threshold value Ith, the voltage V81 of the cell 81 is 3.50 [V], the voltage V82 of the cell 82 is 3.50 [V], the voltage V83 of the cell 83 is 3.50 [V], the voltage V84 of the cell 84 is 3.30 [V], the voltage V91 of the cell 91 is 3.50 [V], the voltage V92 of the cell 92 is 3.50 [V], the voltage V93 of the cell 93 is 3.50 [V], and the voltage V94 of the cell 94 is 2.90 [V], as illustrated in FIG. 3 (a). In this case, a total voltage of the battery pack 8 is 13.80 [V], a total voltage of the battery pack 9 is 13.40 [V], and it is assumed that that a reflux current flows from the battery pack 8 to the battery pack 9. It is also assumed that the voltage threshold value Vth is 0.10 [V].

First, when the controller 7 obtains the voltages V81-V84 and the voltages V91-V94, the controller 7 calculates a voltage difference Vd1 between the highest voltage of 3.50 [V] and the lowest voltage of 3.30 [V] among the voltages V81-V84 to be 0.20 [V], and calculates a voltage difference Vd2 between the highest voltage of 3.50 [V] and the lowest voltage of 2.90 [V] among the voltages V91-V94 to be 0.60 [V].

When the controller 7 determines that neither the voltage difference Vd1 (0.20 [V]) nor the voltage difference Vd2 (0.60 [V]) is less than or equal to the voltage threshold value Vth (0.10 [V]), the controller 7 sets a target voltage Vt1 of the battery pack 8 to be the lowest voltage of 3.30 m among the voltages V81-V84, and sets a target voltage Vt2 of the battery pack 9 to be the lowest voltage of 2.90 [V] among the voltages V91-V94.

The controller 7 turns on the respective switches 41-43 such that all of the voltages V81-V83 of the cells 81-83 other than the cell 84 having the lowest voltage V84 become the target voltage Vt1 (3.30 [V]), and turns on the respective switches 51-53 such that all of the voltages V91-V93 other than the lowest voltage V94 become the target voltage Vt2 (2.90 [V]), until a prescribed time period has passed. In this case, the voltages V81-V83 respectively decrease by a total voltage (−0.07 [V]) of a voltage decrease amount of −0.02 [V] due to a reflux current flowing from the battery pack 8 to the battery pack 9 and a voltage decrease amount of −0.05 m due to energy consumption of the resistors 45-47, and the voltage V84 decreases by the voltage decrease amount (−0.02 [V]) due to the reflux current flowing from the battery pack 8 to the battery pack 9. In addition, the voltages V91-V93 respectively decrease by a total voltage (−0.03 [V]) of a voltage increase amount of +0.02 m due to the reflux current flowing from the battery pack 8 to the battery pack 9 and a voltage decrease amount of −0.05 [V] due to energy consumption of the resistors 55-57, and the voltage V94 increases by the voltage increase amount (+0.02 [V]) due to the reflux current flowing from the battery pack 8 to the battery pack 9.

When the current detected by the current detector 6 has a value less than or equal to the current threshold value Ith, the controller 7 obtains the voltages V81-V84 and the voltages V91-V94 again. As illustrated in FIG. 3(b), for example, the voltages V81-V83 of 3.43 [V], the voltage V84 of 3.28 m, the voltages V91-V93 of 3.47 [V], and the voltage V94 of 2.92 [V] are obtained. In this case, a total voltage of the battery pack 8 is 13.57 [V], a total voltage of the battery pack 9 is 13.33 [V], and it is assumed that a reflux current flows from the battery pack 8 to the battery pack 9.

The controller 7 calculates a voltage difference Vd1 between the highest voltage of 3.43 [V] and the lowest voltage of 3.28 [V] among the voltages V81-V84 to be 0.15 [V], and calculates a voltage difference Vd2 between the highest voltage of 3.47 [V] and the lowest voltage of 2.92 [V] among the voltages V91-V94 to be 0.55 [V].

When the controller 7 determines that neither the voltage difference Vd1 (0.15 [V]) nor the voltage difference Vd2 (0.55 [V]) is less than or equal to the voltage threshold value Vth (0.10 [V]), the controller 7 resets the target voltage Vt1 of the battery pack 8 to be the lowest voltage of 3.28 [V] among the voltages V81-V84, and resets the target voltage Vt2 of the battery pack 9 to be the lowest voltage of 2.92 [V] among the voltages V91-V94.

The controller 7 turns on the respective switches 41-43 such that all of the voltages V81-V83 of the cells 81-83 other than the cell 84 having the lowest voltage V84 become the updated target voltage Vt1 (3.28 [V]), and turns on the respective switches 51-53 such that all of the voltages V91-V93 other than the lowest voltage V94 become the updated target voltage Vt2 (2.92 [V]), until a prescribed time period has passed. In this case, the voltages V81-V83 respectively decrease by a total voltage (−0.07 [V]) of a voltage decrease amount of −0.02 [V] due to a reflux current flowing from the battery pack 8 to the battery pack 9 and a voltage decrease amount of −0.05 [V] due to energy consumption of the resistors 45-47, and the voltage V84 decreases by the voltage decrease amount (−0.02 [V]) due to the reflux current flowing from the battery pack 8 to the battery pack 9. In addition, the voltages V91-V93 respectively decrease by a total voltage (−0.03 [V]) of a voltage increase amount of +0.02 [V] due to the reflux current flowing from the battery pack 8 to the battery pack 9 and a voltage decrease amount of −0.05 [V] due to energy consumption of the resistors 55-57, and the voltage V94 increases by the voltage increase amount (+0.02 [V]) due to the reflux current flowing from the battery pack 8 to the battery pack 9.

When a current detected by the current detector 6 has a value less than or equal to the current threshold value Ith, the controller 7 obtains the voltages V81-V84 and the voltages V91-V94 again. As illustrated in FIG. 3(c), for example, the voltages V81-V83 of 3.36 [V], the voltage V84 of 3.26 [V], the voltages V91-V93 of 3.44 [V], and the voltage V94 of 2.94 [V] are obtained. In this case, a total voltage of the battery pack 8 is 13.34 [V], a total voltage of the battery pack 9 is 13.26 [V], and it is assumed that a reflux current flows from the battery pack 8 to the battery pack 9.

The controller 7 then calculates a voltage difference Vd1 between the highest voltage of 3.36 [V] and the lowest voltage of 3.26 [V] among the voltages V81-V84 to be 0.10 [V], and calculates a voltage difference Vd2 between the highest voltage of 3.44 [V] and the lowest voltage of 2.94 [V] among the voltages V91-V94 to be 0.50 [V].

When the controller 7 determines that the voltage difference Vd1 (0.10 [V]) is less than or equal to the voltage threshold value Vth (0.10 [V]), the controller 7 finishes the cell balance control operation of the battery pack 8. When the controller 7 determines that the voltage difference Vd2 (0.50 [V]) is not less than or equal to the voltage threshold value Vth (0.10 [V]), the controller 7 resets the target voltage Vt2 of the battery pack 9 to be the lowest voltage of 2.94 [V] among the voltages V91-V94.

The controller 7 then turns on the switches 51-53 such that the voltages V91-V93 become the updated target voltage Vt2 (2.94 [V]), until a prescribed time period has passed. In this case, each of the voltages V81-V84 decreases by the voltage decrease amount (−0.02 [V]) due to the reflux current flowing from the battery pack 8 to the battery pack 9. The voltages V91-V93 respectively decrease by a total voltage (−0.03 [V]) of a voltage increase amount of +0.02 [V] due to the reflux current flowing from the battery pack 8 to the battery pack 9 and a voltage decrease amount of −0.05 [V] due to energy consumption of the resistors 55-57, and the voltage V94 increases by the voltage increase amount (+0.02 [V]) due to the reflux current flowing from the battery pack 8 to the battery pack 9.

When the operations above are repeated hereafter, at a certain point of time, each of the voltages V81-V83 is changed to be 3.20 [V], the voltage V84 is changed to be 3.10 [V], each of the voltages V91-V93 is changed to be 3.20 [V], and the voltage V94 is changed to be 3.10 [V], as illustrated in FIG. 3(d), for example. In this case, a total voltage of the battery pack 8 is 12.70 [V], and a total voltage of the battery pack 9 is 12.70 [V], and it is assumed that neither a reflux current that flows from the battery pack 8 to the battery pack 9 nor a reflux current that flows from the battery pack 9 to the battery pack 8 exists.

The controller 7 calculates a voltage difference Vd1 between the highest voltage of 3.20 [V] and the lowest voltage of 3.10 [V] among the voltages V81-V84 to be 0.10 [V], and calculates a voltage difference Vd2 between the highest voltage of 3.20 [V] and the lowest voltage of 3.10 [V] among the voltages V91-V94 to be 0.10 [V].

When the controller 7 determines that both the voltage difference Vd1 (0.10 [V]) and the voltage difference Vd2 (0.10 [V]) are less than or equal to the voltage threshold value Vth (0.10 [V]), the controller 7 finishes the cell balance control operation of the battery packs 8 and 9.

As described above, in the voltage equalizer 1 according to the embodiment, the target voltages Vt1 and Vt2 are repeatedly updated on the basis of cell voltages after fluctuation due to a reflux current or energy consumption of resistors until both of the voltage differences Vd1 and Vd2 become less than or equal to the voltage threshold value Vth, and therefore voltage equalization can be repeatedly performed with a high accuracy in each of the battery packs 8 and 9 until the battery packs 8 and 9 have a total voltage similar to each other and fluctuation in cell voltages due to the influence of the reflux current or the energy consumption of the resistors becomes small. Namely, respective voltages of the cells 81-84 and the cells 91-94 that respectively constitute the battery packs 8 and 9 connected in parallel to each other can be equalized.

In addition, in the voltage equalizer 1 according to the embodiment, when a current detected by the current detector 6 has a value less than or equal to the current threshold value Ith, a cell balance control operation is started, and therefore fluctuation in cell voltages due to a reflux current can be suppressed, and a time period from the start to the end of the cell balance control operation can be reduced, compared with a case in which the cell balance control operation is started without determining whether the current detected by the current detector 6 has a value less than or equal to the current threshold value Ith. Accordingly, wasteful energy consumption in the battery packs 8 and 9 due to the cell balance control operation (the resistors 45-48 and the resistors 55-58) can be suppressed.

The invention claimed is:
1. A voltage equalizer comprising:
a first voltage detector that detects voltages of a plurality of cells that constitute a first battery pack;
a second voltage detector that detects voltages of a plurality of cells that constitute a second battery pack connected in parallel to the first battery pack;
a plurality of first resistors that are respectively connected in parallel to the plurality of cells that constitute the first battery pack;
a plurality of second resistors that are respectively connected in parallel to the plurality of cells that constitute the second battery pack;
a plurality of first switches that are respectively provided between the plurality of cells that constitute the first battery pack and the plurality of first resistors;
a plurality of second switches that are respectively provided between the plurality of cells that constitute the second battery pack and the plurality of second resistors; and
a controller
that repeatedly sets a lowest voltage among the voltages detected by the first voltage detector to be a first target voltage and sets a lowest voltage among the voltages detected by the second voltage detector to be a second target voltage based on the voltages of the plurality of cells that constitute the first battery pack and the voltages of the plurality of cells that constitute the second battery pack after fluctuation due to a reflux current that flows between the first and second battery packs and energy consumption of the first and second resistors,
that repeatedly turns on/off each of the plurality of first switches such that the voltages of cells other than a cell having the lowest voltage become the first target voltage in the first battery pack during a time period shorter than a time period needed for the voltages of the cells other than the cell having the lowest voltage to reach the first target voltage, and
that repeatedly turns on/off each of the plurality of second switches such that the voltages of cells other than a cell having the lowest voltage become the second target voltage in the second battery pack during a time period shorter than a time period needed for the voltages of the cells other than the cell having the lowest voltage to reach the second target voltage, until the controller determines based on the voltages detected by the first and second voltage detectors that neither the voltages of the plurality of cells that constitute the first battery pack nor the voltages of the plurality of cells that constitute the second battery pack need to be equalized.

2. The voltage equalizer according to claim 1, wherein the controller determines that neither the voltages of the plurality of cells that constitute the first battery pack nor the voltages of the plurality of cells that constitute the second battery pack need to be equalized when a first voltage difference between a highest voltage and the lowest voltage among the voltages detected by the first voltage detector and a second voltage difference between a highest voltage and the lowest voltage among the voltages detected by the second voltage detector become less than or equal to a voltage threshold value.

3. The voltage equalizer according to claim 1, further comprising:

a current detector that detects a current that flows from the first battery pack to the second battery pack, or a current that flows from the second battery pack to the first battery pack, wherein the controller commences determining whether the voltages of the plurality of cells that constitute the first battery pack need to be equalized and whether the voltages of the plurality of cells that constitute the second battery pack need to be equalized, when the current detected by the current detector has a value less than or equal to a current threshold value.

4. The voltage equalizer according to claim 2, further comprising:

a current detector that detects a current that flows from the first battery pack to the second battery pack, or a current that flows from the second battery pack to the first battery pack, wherein the controller commences determining whether the voltages of the plurality of cells that constitute the first battery pack need to be equalized and whether the voltages of the plurality of cells that constitute the second battery pack need to be equalized, when the current detected by the current detector has a value less than or equal to a current threshold value.

* * * * *